(12) United States Patent
Eberly

(10) Patent No.: US 11,472,720 B1
(45) Date of Patent: Oct. 18, 2022

(54) AQUEOUS FIREFIGHTING FOAM WASTEWATER MANAGEMENT SYSTEM

(71) Applicant: PARKTEQ, LLC, Houston, TX (US)

(72) Inventor: Christopher Nolan Eberly, Chappell Hill, TX (US)

(73) Assignee: PARK ENVIRONMENTAL EQUIPMENT, LLC, Houston, TX (US)

( * ) Notice: Subject to any disclaimer, the term of this patent is extended or adjusted under 35 U.S.C. 154(b) by 0 days.

(21) Appl. No.: 17/328,390

(22) Filed: May 24, 2021

(51) Int. Cl.
| | | |
|---|---|---|
| C02F 1/40 | (2006.01) |
| C02F 1/00 | (2006.01) |
| B01D 17/12 | (2006.01) |
| B01D 17/02 | (2006.01) |
| B64F 1/22 | (2006.01) |
| A62C 3/02 | (2006.01) |
| C02F 101/32 | (2006.01) |
| A62C 99/00 | (2010.01) |
| C02F 103/44 | (2006.01) |

(52) U.S. Cl.
CPC ............ *C02F 1/40* (2013.01); *B01D 17/0214* (2013.01); *B01D 17/12* (2013.01); *C02F 1/006* (2013.01); *A62C 3/0292* (2013.01); *A62C 99/0036* (2013.01); *B64F 1/222* (2013.01); *C02F 2101/32* (2013.01); *C02F 2103/44* (2013.01); *C02F 2201/005* (2013.01)

(58) Field of Classification Search
CPC ........ C02F 1/006; C02F 1/40; C02F 2103/44; B01D 17/0214; B01D 17/12; B01D 21/0093; B64F 1/222

USPC ........ 210/170.01, 257.1, 521, 536, 540, 800
See application file for complete search history.

(56) References Cited

U.S. PATENT DOCUMENTS

| | | | | |
|---|---|---|---|---|
| 1,406,950 | A * | 2/1922 | Fackert .............. | B01D 17/0208 210/538 |
| 4,132,645 | A * | 1/1979 | Bottomley ......... | B01D 17/0214 210/540 |
| 4,783,257 | A * | 11/1988 | Morioka ............ | B01D 17/0214 210/167.01 |
| 5,098,580 | A * | 3/1992 | Andersen ................. | B67D 7/76 137/15.16 |
| 5,160,040 | A * | 11/1992 | Odawara ................. | B05B 16/80 210/257.1 |
| 5,342,523 | A * | 8/1994 | Kuwashima .............. | C02F 3/28 210/253 |
| 5,554,301 | A * | 9/1996 | Rippetoe ............ | B01D 17/0214 210/540 |

(Continued)

*Primary Examiner* — Christopher Upton
(74) *Attorney, Agent, or Firm* — Egbert, McDaniel & Swartz, PLLC

(57) ABSTRACT

A wastewater management system has a container with the first chamber and a second chamber therein, a diverter valve having an inlet and a first outlet, a holding tank interconnected to the first outlet of the diverter valve, and a controller connected to the diverter valve so as to move the diverter valve to the first position. The first outlet is directed to the first chamber. The inlet of the diverter valve is adapted to receive wastewater from a location remote from the container. The inlet is connected to the first outlet in the first position. The diverter valve can be a three-way valve having a first outlet directed to the first chamber and a second outlet directed to a second chamber. The controller moves the diverter valve between first and second outlets.

11 Claims, 5 Drawing Sheets

(56) References Cited

U.S. PATENT DOCUMENTS

| | | | |
|---|---|---|---|
| 6,562,236 B2 * | 5/2003 | Rylander | ............... E03F 1/002 |
| | | | 210/170.08 |
| 7,470,361 B2 | 12/2008 | Eberly | |
| 9,963,358 B2 | 5/2018 | Eberly et al. | |
| 2003/0213502 A1 * | 11/2003 | Eriksson | .................. C02F 9/00 |
| | | | 134/123 |

* cited by examiner

AQUEOUS FIREFIGHTING FOAM WASTEWATER MANAGEMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the management of wastewater. More particularly, the present invention relates to the management of firefighting foam as used in various enclosures. More particularly, the present invention relates to the management of oil/water wastewater and the management of firefighting foam.

2. Description of Related Art Including Information Disclosed Under 37 CFR 1.97 and 37 CFR 1.98

Aqueous firefighting foam is a synthetic firefighting foam consisting of combinations of fluorochemical and hydrocarbon surfactants combined with high boiling point solvents and water. The surfactants alter the surface properties of water in such a way that a thin aqueous film can spread on a hydrocarbon fuel even though the aqueous film is denser than the fuel. Aqueous firefighting foam systems have superior fire-extinguishing capability of flammable or combustible liquids, especially jet fuel spills.

Aqueous film-forming foam (AFFF) solutions are used extensively in fire suppression systems for aviation facilities and fire training facilities. Aqueous film-forming foam systems are proven and essential to protect valuable, mission-essential aircraft and hanger facilities. Aqueous film-forming foam contains fluorosurfactants that are man-made chemicals that include perfluoroalkyl and polyfluoralalkyl substances (PFAS), perfluorooctane sulfonate (PFOS) and for perfluorooctanoic acid (PFOA). These chemicals are durable chemicals with properties that include oil, water, temperature, chemical and fire resistance. Unfortunately, the benefits of aqueous film-forming foam are compromised by the fact that the fluorosurfactant are harmful to the environment.

Aqueous film-forming foam has been used on hundreds of military bases and airports around the United States since at least the early 1970s. Aqueous film-forming foam discharge should not be allowed to flow untreated into the ecosystems or into the sewage systems in large quantities. Many states have filed lawsuits against the government in order to rectify contaminated water aquifers. Although foam suppression systems are still being used and deployed, their discharge issues remain unsolved. In various washing operations, such those as those systems used to wash helicopters, airplanes, trucks and automobiles, a great amount of water is wasted when the wash and rinse water is not collected and cleaned for reuse. Further, in addition to water costs, without a water recycle system, additional expenses are incurred in city or county water treatment and sewer system charges. When washing such vehicles, the water used in the wash collects hydrocarbons originating from petroleum distillate.

Large spills of oil can flow into storm drains, such as from loading docks, gas stations, hangers, and similar facilities. In addition, qualities of oil and other hydrocarbons can frequently spill onto the ground and subsequent water flow, such as from rain, can cause oil to flow into storm drains. This is often referred to as "non-point-source pollution". The volume of oil from non-point-source pollution in typical water runoff is surprisingly large. The ability to collect such oil-containing water can cause enormous annual costs, both financial and environmental, for containing and treating those waters. In various washing facilities, the operators are heavily fined if a significant amount of oil and other hydrocarbons pass with the water flow to the sewage system. These fines can often work disadvantageously to the profitability of such washing facilities. As such, it is important to be able to provide a system for preventing the flow of oil outwardly of the water retention tank and sewer system.

FIG. 1 shows a prior art system for the management of firefighting foam from an aircraft hangar. In particular, the system 10 in FIG. 1 has an aircraft hangar 12 with a floor 14. A trench 16 is provided in the floor 14 so as to receive liquids therein. The hangar 12 will have a fire suppression system 18. The floor 14 is sloped to the trench 16 or to any other types of drains. All fluids that hit the floor 14 will drain into the trench 16. When the fire suppression system 18 is not actuated so as to release firefighting foam therefrom, the trench 16 will typically receive water and oil mixtures that result from the washing of the vehicle within the hangar 12. As such, this oil and water mixture will flow by gravity toward an oil-water separator 32. Oil-water separator 32 can be in the nature of conventional oil-water separators (such as that shown in U.S. Pat. Nos. 7,470,361 and 9,963,358 to the present inventor).

A diverter valve 22 is connected to the oil-water separator 32 and to the trench 16 by pipe 24. Pipe 24 serves to convey firefighting foam or oil-water wastewater from hanger 12 to diverter valve 22. Pipe 24 will communicate with the trench 16. Pipe 34 will flow from the outlet of the oil-water separator 32. As such, in day-to-day operations, the effluent passing outwardly of the oil-water separator 32 will flow from the diverter valve 22 along pipe 28. The oil-water separator 32 contains and an access hatchway 30. Ultimately, the water component from the oil-water separator can flow outwardly to the sewer 34. In this configuration, the diverter valve is in a position so as to connect pipe 24 with pipe 28.

In the event of a release of firefighting foam from fire suppression system 18, the firefighting foam will flow from the trench 16 along pipe 24 to the diverter valve 22. The diverter valve 22 is immediately switched to a different position so that the firefighting foam will flow through pipe 36 into the holding tank 38. An automatic control monitor system 20 is provided on holding tank 38. The automatic control system can serve so as to control the level of foam within the holding tank 38 to monitor the condition of the foam within the tank 38 and to relay information in the event that the holding tank 38 should become overloaded. An access port 40 is provided on the holding tank 38 so as to allow for the removal of the firefighting foam from the holding tank 38.

Under normal conditions, water and other liquids from floor washdown, equipment cleaning, accidental spills, condensate, and rainwater will drain on the floor where they eventually drain to the trench or floor drain. This liquid typically has a low flow rate and contains pollutants. The liquid flows through the oil-water separator 32 where the pollutants are separated and detained in the oil-water separator 32. Solids will float or sink depending on the specific gravity. Non-emulsified liquids with a specific gravity of less than 1.0 will float to the surface and will be retained by the oil-water separator. The resulting flow will exit the oil-water separator and to the sanitary sewer system.

Upon activation of the fire suppression system 18, aqueous foam and/or water is released within the hangar 12. This may be due to system testing, accidental discharge, or an actual fire. A signal is sent to the control panel 20 where the diverter valve changes position and diverts wastewater flow from the oil-water separator to the containment tank where all the fluids are retained. The diverter valve can stay in this position until all of the foam/water is drained from the hangar 12 and the drainage piping.

FIG. 2 is a schematic diagram of the firefighting foam wastewater treatment system 10 of the prior art. In particular, FIG. 2 shows the hangar 12 as having the trench 16 formed at the floor 14. A control panel 44 can be mounted to the side 46 of the hangar 12. Control panel 44 can be used so as to manually operate the fire suppression system 18, to monitor the fire suppression system 18, and to relay information from the various other components of the wastewater management system 10. In FIG. 2, it can be seen that a pipe 24 connects the trench 16 to the diverter valve 22. Diverter valve 22 has an inlet 46 and a pair of outlets 48 and 50. A controller 52 controls the movement of the diverter valve 22 in relation to the occurrence of the release of firefighting foam from the foam suppression system 18. In particular, as was stated hereinbefore, in normal operations, the trench 16 will collect oil, water and other debris from the floor 14. As such, the inlet 46 of the diverter valve 22 will connect to the outlet 48. A pipe 54 will carry the material to the oil-water separator 21. Oil-water separator 21 includes coalescing plates 56 therein. Ultimately, the water component of the oil-water mixture within the oil-water separator 21 will flow outwardly along pipe 58 through sample well 60 and to the sewer 34.

On the other hand, when the fire suppression system is activated (either by the sensing of a fire or by a manual operation to the control panel 44), the firefighting foam will pass to the trench 16 and through the pipe 24 to the diverter valve 22. When an actuation signal is received by control 52 of diverter valve 22, the inlet 46 connects to the outlet 50. Ultimately, the fire suppressing foam will flow along line 62 into a lift station 64. Lift station 64 includes pumps 66 therein. Pumps 66 will cause the fire-suppressing foam received within the lift station 64 to pass upwardly along pipe 68 and over to holding tanks 38 and 70. FIG. 2 shows that there are various electrical lines that connect between the control panel 44 and the diverter valve 22, the lift station 64, the oil-water separator 21 and the holding tanks 38 and 70. Typically, these lines (so shown generally at 72) will be level sensors, control lines, and communication systems.

A major problem with the prior art system shown in FIGS. 1 and 2 is the large amount of equipment that must be separately installed in an area adjacent to the facility. In particular, various pipes need to be installed running from the hangar 12 to the various components. In particular, a pair of pipes 24 and 26 are required so as to deliver either the firefighting foam or the oil-water wastewater to the diverter valve 22. In this circumstance, a three-way valve is utilized as the diverter valve 22. In other circumstances, a two-way valve can be implemented in association with a single pipe. Ultimately, each of the components is positioned in separate locations. As such, the installation of the piping needs to be precise and becomes rather complicated. The arrangement shown in FIGS. 1 and 2 has a very large footprint, is quite difficult to install, and has significant freight costs.

It is an object of the present invention to provide a wastewater management system that makes practical use of existing fire suppression technology.

It is another object of the present invention to provide a wastewater management system that is eco-friendly.

It is another object of the present invention to provide a wastewater management system that is sustainable.

It is another object of the present invention to provide a wastewater management system that conveys, treats, diverts, contains, samples, pumps and manages the wastewater.

It is another object of the present invention to provide a wastewater management system that is a single unit.

It is a further object of the present invention to provide a wastewater management system that is a single-source integrated system.

It is still another object of the present invention provide a wastewater management system that is compact.

It is another object of the present invention to provide a wastewater management system that has small footprint.

It is still a further object of the present invention provide a wastewater management system that is easy to install.

It is still a further object the present invention to provide a wastewater management system that is lightweight.

It is still a further object of the present invention to provide a wastewater management system that is reduced freight costs.

These and other objects and advantages of the present invention will become apparent from a reading of the attached specification and appended claims.

BRIEF SUMMARY OF THE INVENTION

The present invention is a wastewater management system that comprises a container having a first chamber and a second chamber therein, a diverter valve having an inlet and first and second outlets, a holding tank connected or interconnected to the first outlet, and a controller connected to the diverter valve so as to move the diverter valve between a first position and a second position. The first outlet is directed to the first chamber. The second outlet is directed to the second chamber. The inlet of the diverter valve is adapted to receive wastewater from the a location remote from the container. The first position of the diverter valve has the inlet connected to the first outlet. The second position of the diverter valve has the inlet connected to the second outlet. The holding tank is adapted to receive one type of wastewater therein. In an embodiment, the first chamber can be the holding tank.

The first chamber has a lift station thereon. The lift station has an outlet directed to the holding tank. The lift station is adapted to pump the one type of wastewater to the holding tank. In an embodiment, the lift station is positioned below grade while the holding tank is positioned above grade. The one type of wastewater is a fire suppressing foam.

The second chamber of the container has an oil-water separator therein. The second outlet of the diverter valve directs another type of wastewater to the oil-water separator. The oil-water separator causes this another type of wastewater to have an oil component and a water component. The second chamber has a first outlet connected to a sewer so that the water component can flow to the sewer. The second chamber has a second outlet wherein the oil component can be removed or passed from the oil-water separator.

The diverter valve is positioned in the container. In particular, the diverter valve is positioned in the first chamber of the container. The holding tank includes a first holding tank and a second holding tank. The first outlet is connected to at least one of the first and second holding tanks.

The present invention can also include a hangar having a floor. The floor has a trench formed therein. The trench is adapted to receive the firefighting foam. A pipe opens to the trench and is connected the inlet of the diverter valve. A fire suppression system is cooperative with an interior of the hangar. The fire suppression system is adapted to release a firefighting foam upon receiving an actuation symbol. The diverter valve moves from the second position to the first position when the actuation signal is transmitted to the fire suppression system.

The present invention is also a firefighting foam waste management system that comprises a hangar having a floor with a trench formed therein, a fire suppression system cooperative with an interior of the hangar, a container having a first chamber and a second chamber therein, a diverter valve having an inlet and first and second outlets, a pipe extending from the trench of the hangar to the diverter valve, a holding tank connected or interconnected to the first outlet of the diverter valve, and a controller connected to the diverter valve so as to move the diverter valve from the second position to the first position when the fire suppression system is actuated. The trench is adapted to receive the firefighting foam therein. The fire suppression system is adapted to release the fire-fighting foam upon receiving the actuation signal. The first outlet of the diverter valve is directed to the first chamber. The second outlet of the diverter valve is directed to the second chamber. The inlet of the diverter valve is adapted to receive the firefighting foam from the hangar. The diverter valve is actuatable so as to move from the first position wherein the inlet is cooperative with the first outlet and a second position where in the inlet is connected to the second outlet.

In other circumstances, the diverter valve can be a two-way valve that is movable from a first position in which the inlet is blocked at the first outlet and a second position where the inlet is connected to the first outlet. The holding tank is adapted to receive the firefighting foam therein. The controller moves the diverter valve between the first and second positions. In an embodiment, the holding tank can be the first chamber of the container.

In the preferred embodiment, the firefighting foam waste management system has a lift station in the first chamber of the container. The lift station has an outlet directed to the holding tank. The list station is adapted to pump the firefighting foam to the holding tank. The second chamber has an oil-water separator therein. The second outlet of the diverter valve directs the oil/water mixture to the oil-water separator. The oil-water separator causes the oil/water mixture to have an oil component and a water component. The second chamber has a first outlet connected to the sewer so that the water component can flow to the sewer. The second chamber has a second outlet whereby the oil component can be removed or passed from the oil-water separator.

The diverter valve is positioned in the first chamber of the container. The holding tank has a first holding tank and a second holding tank. The first outlet of the diverter valve is connected to at least one of the first and second holding tanks. In an embodiment, the container is below grade and the holding tank is above grade. A control panel is affixed to the hangar. The control panel is connected by lines to the diverter valve and of the holding tank.

The present invention is a sustainable system for managing wastewater or storm water from hangars, aprons, taxiways, runways, helipads, garages, washracks, and other facilities that use aqueous firefighting foam (AFFF) that could include perfluoroalkyl and perfluoroalkyl substances (PFAS), perfluorooctane sulfonate (PFOS) and perfluorooctanoic acid (PFOA). The system includes an automatic diversion valve, a pump station, an oil-water separator, a foam containment tank, and a control system. The system allows for the daily pretreatment of facility water run-off for safe discharge into the public sanitary sewer or stormwater sewer. During a AFFF fire suppression discharge event, the system will automatically divert, convey and safely store AFFF-contaminated wastewater for proper liquid waste disposal.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
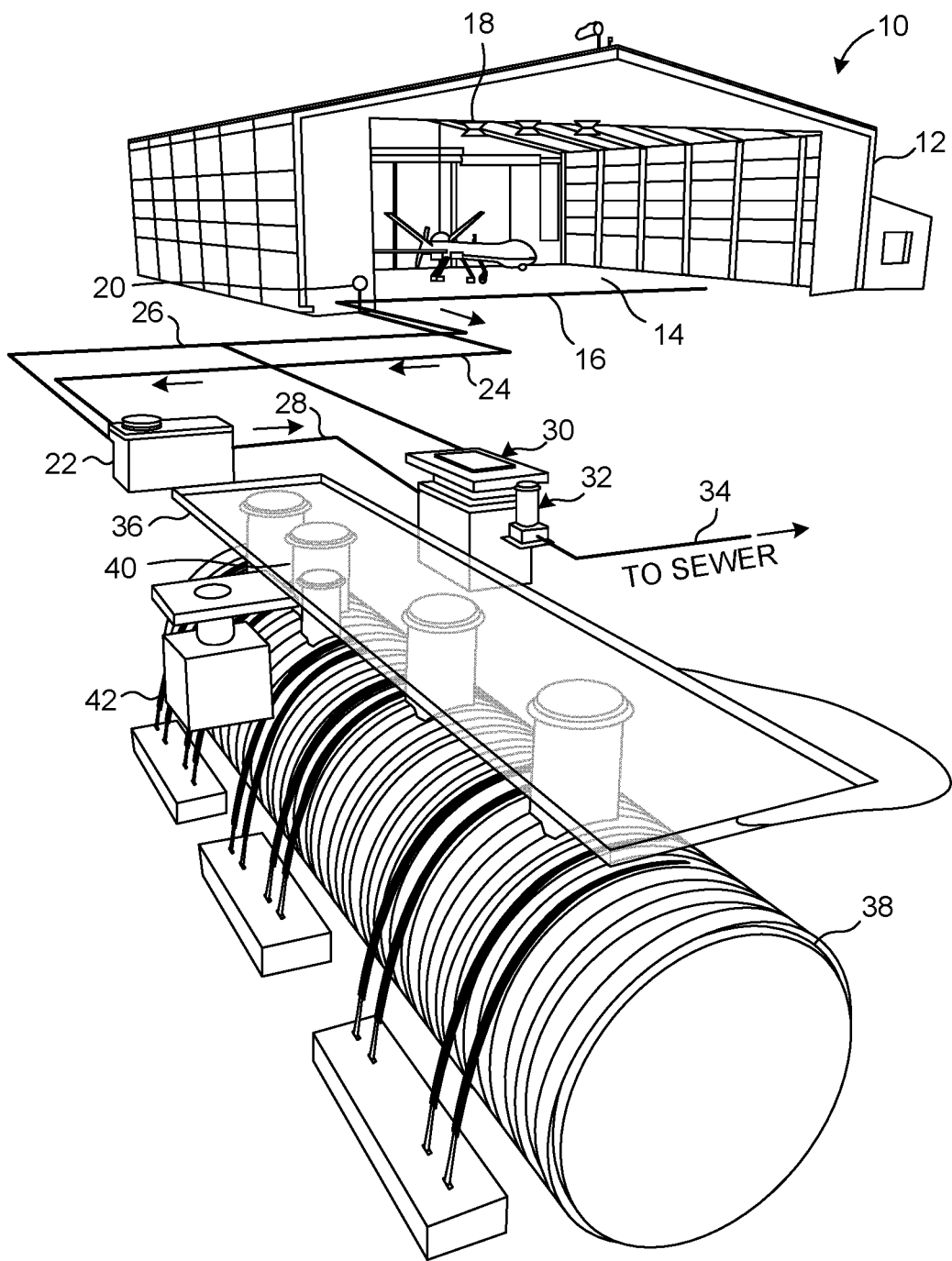
FIG. 1 is an illustration of a firefighting foam waste management system of the prior art.
Figure 2:
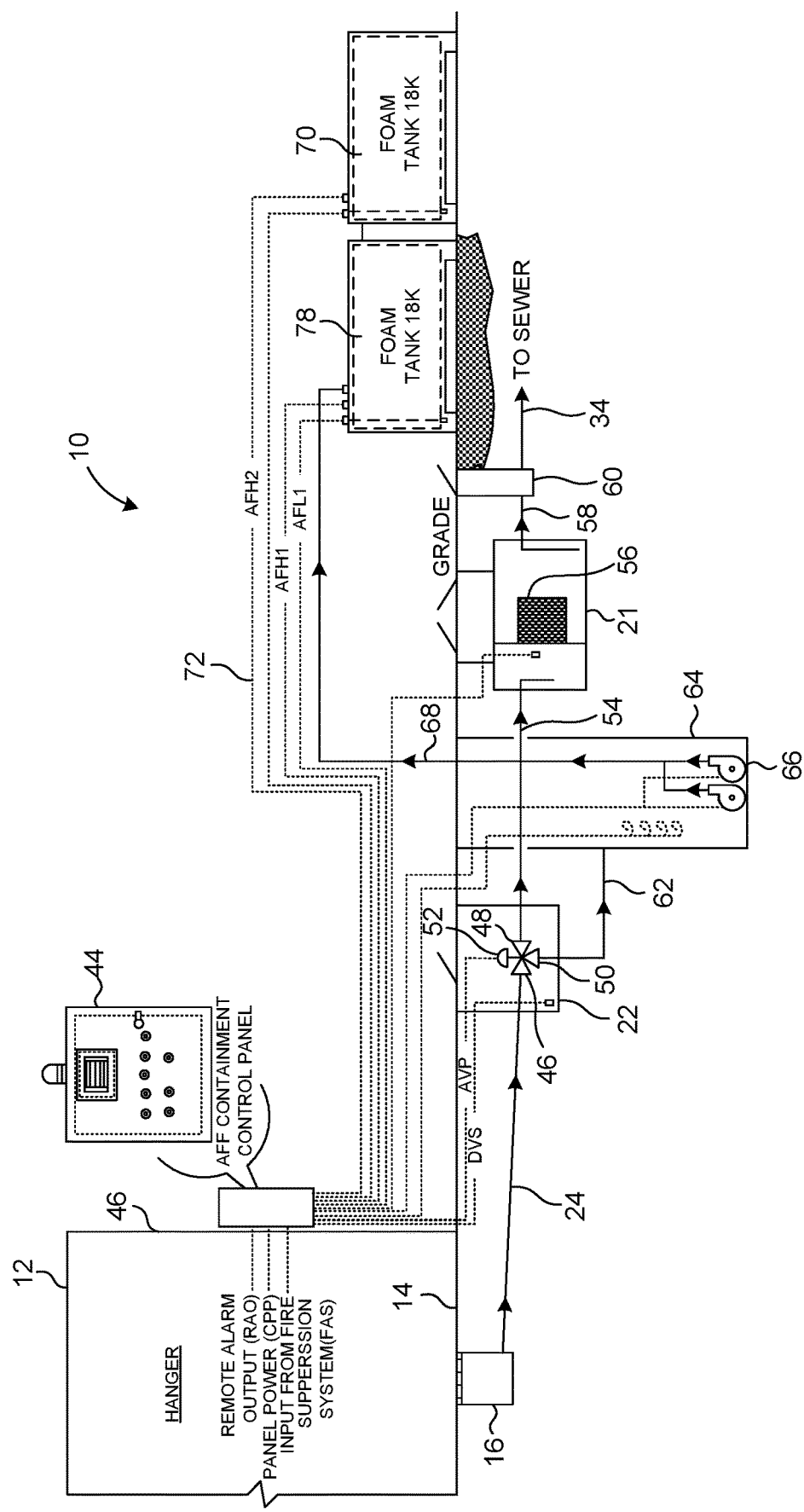
FIG. 2 is a schematic diagram showing the firefighting foam waste management system of the prior art.
Figure 3:
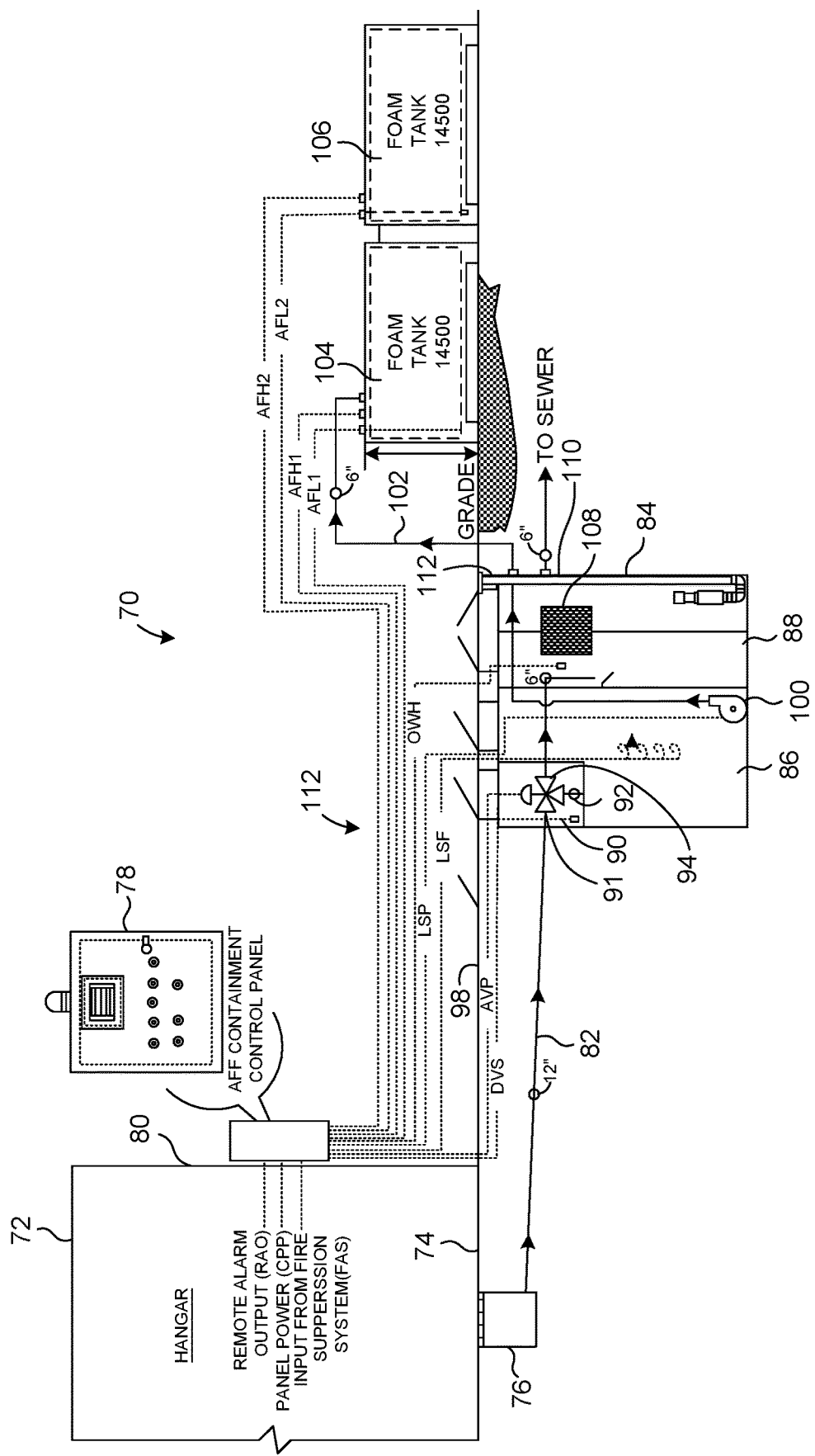
FIG. 3 is a schematic diagram showing the firefighting foam waste management system of the present invention.

Referring to FIG. 3, there is shown the firefighting foam waste management system 70 in accordance with the preferred embodiment the present invention. This waste management system 70 includes a hangar 72. As used herein, the term "hangar" can apply to a wide variety of its installations such as hangars, aprons, taxiways, runways, helipads, garages, washracks, and similar installations. In particular, within the concept of the present invention, the hangar 72 is the type of place where in vehicles are maintained and stored and in which the vehicles can, under various circumstances, discharge oil or fuel onto the floor of such hangar.

In FIG. 3, the hangar 72 has a floor 74 and a trench 76 formed therein. A control panel 78 can be affixed to the side 80 of the hangar 72. The hangar 72 will have a fire suppression system therein. The control panel 78 is configured so as to allow for the fire suppression system to be activated or deactivated. The control panel 78 can also be used so as to monitor the conditions of the other components associated with the waste management system 70 of the present invention.

The trench 76 is adapted to receive water and other liquids from floor washdown, equipment cleaning, accidental spills, condensate and rainwater. These liquids will drain onto the floor 74 and eventually drain to the trench 76. As used herein, the term "trench" can refer to an actual trench or to a drain and pipe system. Normally, these waters and liquids will have a low flow rate and will contain pollutants, such as chemicals or hydrocarbons. These liquids will flow along pipe 82 to a container 84. Container 84 has a first chamber 86 and a second chamber 88 therein. Diverter valve 90 is positioned in the first chamber 86 of the container 84. The pipe 82 will connect with the inlet of the diverter valve 90. The diverter valve 90 will have an inlet 91, a first outlet 92 and a second outlet 94. The first outlet 92 is directed to the first chamber 86. The second outlet 94 is directed to the second chamber 88. A controller 96 is connected by line 98 to the control panel 78. As such, a signal can be transmitted by the control panel 78 so as to move the diverter valve 90 so that the inlet 91 in a first position connects to the first outlet 92 or moves to a second position in which the inlet 91 connects to the second outlet 94.

The first chamber 86 is a lift station having a pump 100 therein. In the first position, the trench 76 will deliver firefighting foam through the pipe 82 through the diverter valve 90 and into the first chamber 86. The pump 100 of the lift station within the first chamber 86 will then pass the firefighting foam (under pressure) through pipe 102 so as to be ultimately delivered into the holding tanks 104 and 106 when the holding tanks are below grade, or above grade. The lift station can be omitted and the first chamber can serve as a holding tank.

The second chamber 88 is an oil-water separator. The oil-water separator 88 has a coalescing plate 108 therein. As such, any oil/water mixture that passes into the oil-water separator 88 will be separated into a water component and an oil component. The water component will pass through an outlet 110 so as to be delivered to the sewage system. The oil component, which is lighter than the water component, can pass outwardly through another outlet 112 or be diverted to the oil-water separator 88.

It can be seen that the container 84 is located below grade. The holding tanks 104 and 106 are located above grade. Various electrical lines 112 will extend from control panel 78 to the diverter valve 90, to the pump 100, to the oil-water separator 88 and to the holding tanks 104 and 106. As such, lines 112 can be power lines for providing power to the various motors of the various components, can be sensors for detecting liquid levels, and can be control lines for opening and closing valves.

In the oil-water separator, the pollutants are separated and detained in the oil-water separator 88. Solids will float or sink depending on the specific gravity thereof. Any non-emulsified liquids with a specific gravity of less than 1.0 will float to the surface and will be retained by the oil-water separator 88. The resulting flow will exit the oil-water separator 88 and enter the sanitary sewer system.

Upon activation of the fire suppression system, aqueous foam and/or water is released within the protected structure. This can be due to system testing, accidental discharge, or an actual fire. A signal is sent to the control panel 78 so that the diverter valve 90 changes position and diverts wastewater flow from the oil-water separator 88 to the containment tanks 104 and 106 wherein all the fluids are retained. The diverter valve will stay in this position until all the foam/water is drained from the structure and the drainage piping. The system can be timer-based or can be manually reset.

The floor drain system is in the area protected by the fire suppression system. The flooring is sloped to the floor drains or trench drain. All fluids that hit the hangar floor will drain into the trench drain. Piping connects the trench drain to the container 84. The container 84 will include the diverter valve 90, the oil-water separator 88, and the lift station 86. The lift station 86 can also function as a holding tank. It is only when the lift station 86 exceeds its capacity that the holding tanks 104 and 106 are utilized. The lift pump station 86 is necessary where above-ground wastewater storage is required or when underground storage is located a distance away.

The diverter valve 92 has one incoming pipe and two exiting pipes. One of the exiting pipes is directed to the oil-water separator 88 and the sanitary sewer 110. This will be the normal operating condition of the diverter valve assembly. Another pipe is directed to the containment tank 86, to the holding tanks 104 and 106, or to a pond. This is an alarm condition in which the fire suppression system has been activated. The diverter valve system can include an automatic control system that will allow the central fire alarm system to activate the diverter valve. The control system will provide valve position status and automatic and manual control. Upon activation of the fire suppression system, a signal is sent to the control panel 78. The diverter valve changes position and diverts wastewater flow from the oil-water separator to the containment tank where all the fluids are retained. After activation, the containment tank is eventually emptied by liquid waste disposal company or can be emptied by managed dosing (pumped at a low flow rate). The dosed flow can be directed to the oil-water separator 88 where solids and hydrocarbons are separated and retained. The treated effluent is discharged to the sanitary sewer.

Figure 4:
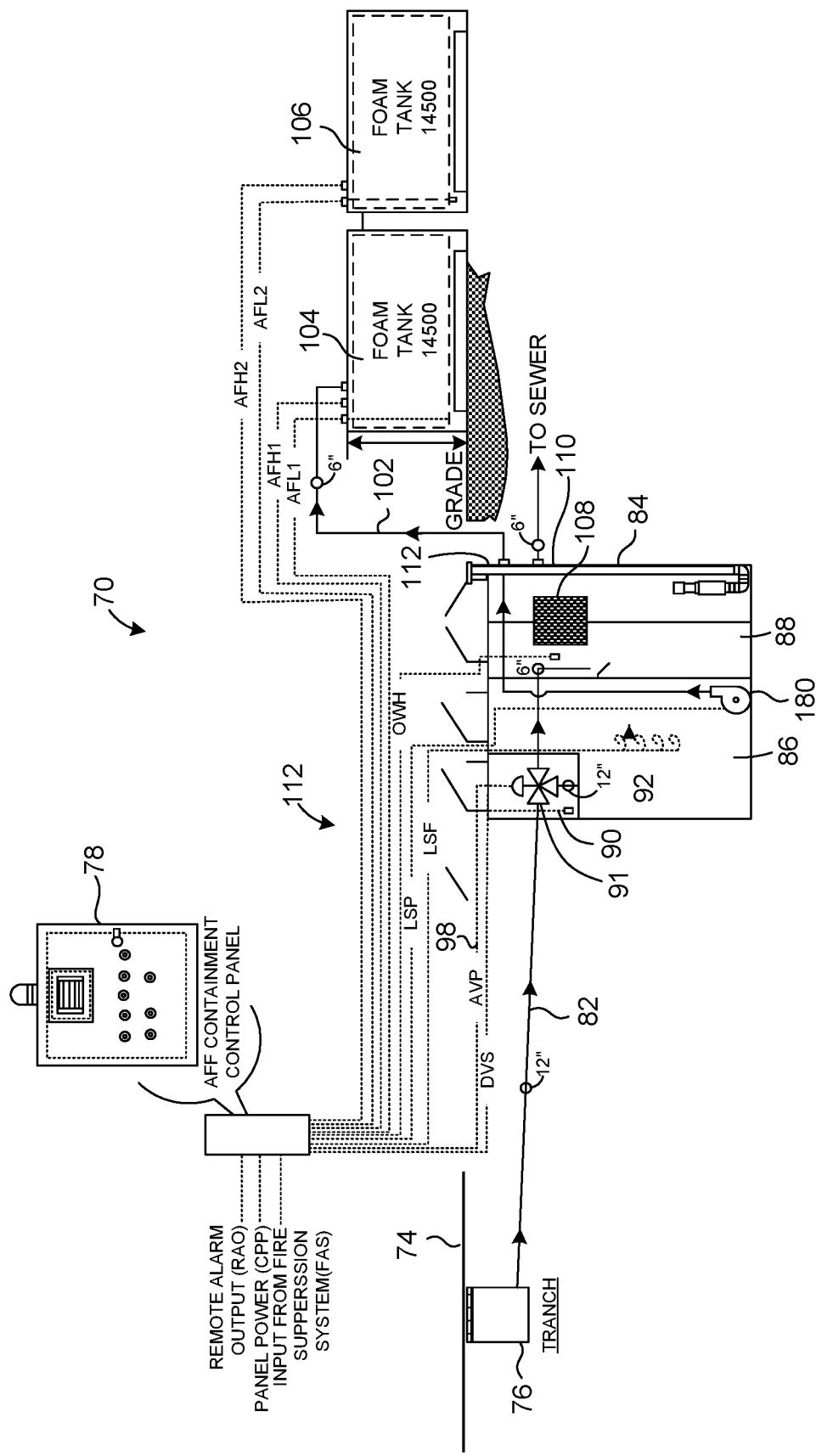
FIG. 4 shows a schematic diagram showing the firefighting foam waste management system of the present invention is used a non-covered outdoor area subject to rain water and using a three-way diverter valve.

FIG. 4 is a schematic view of the wastewater treatment system 70 of FIG. 3 as used in an outdoor uncovered area. In particular, this is applicable for use in association with aprons, taxiways, runways, washracks, and similar areas. This embodiment of the present invention shows the three-way diverter valve 91 in which the first outlet is directed toward a storm sewer. In particular, in FIG. 4, the diverter valve can be either a three-way diverter valve or a two-way diverter valve.

Figure 5:
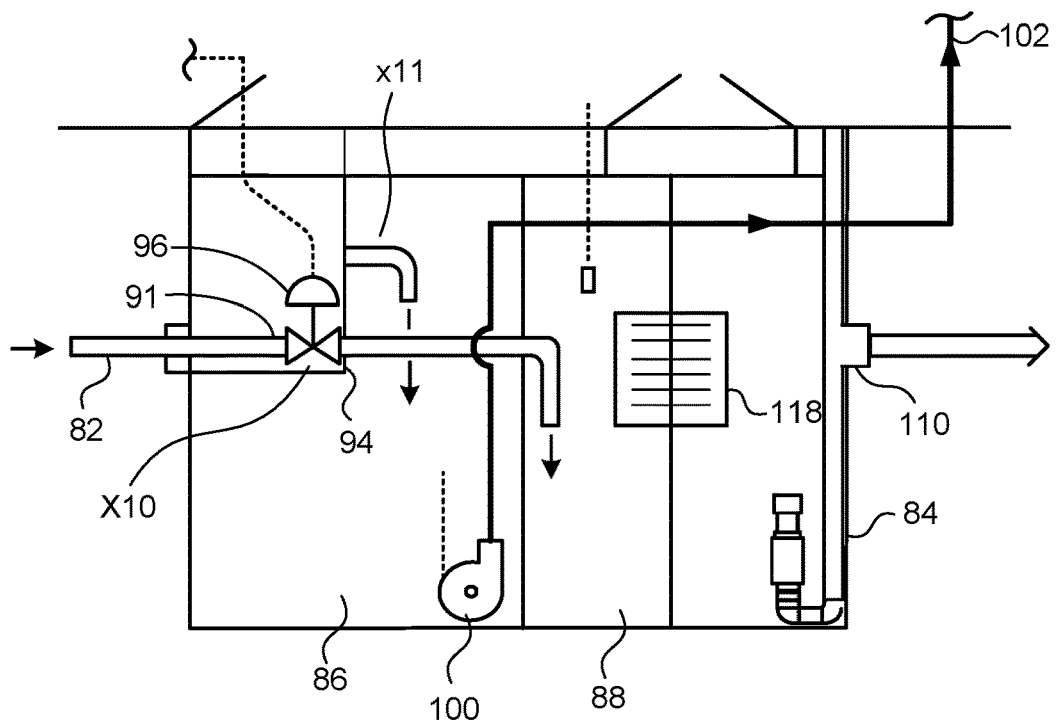
FIG. 5 is a schematic diagram showing the firefighting foam waste management system of the present invention utilizing a three-way diverter valve in a covered service area.
Figure 6:
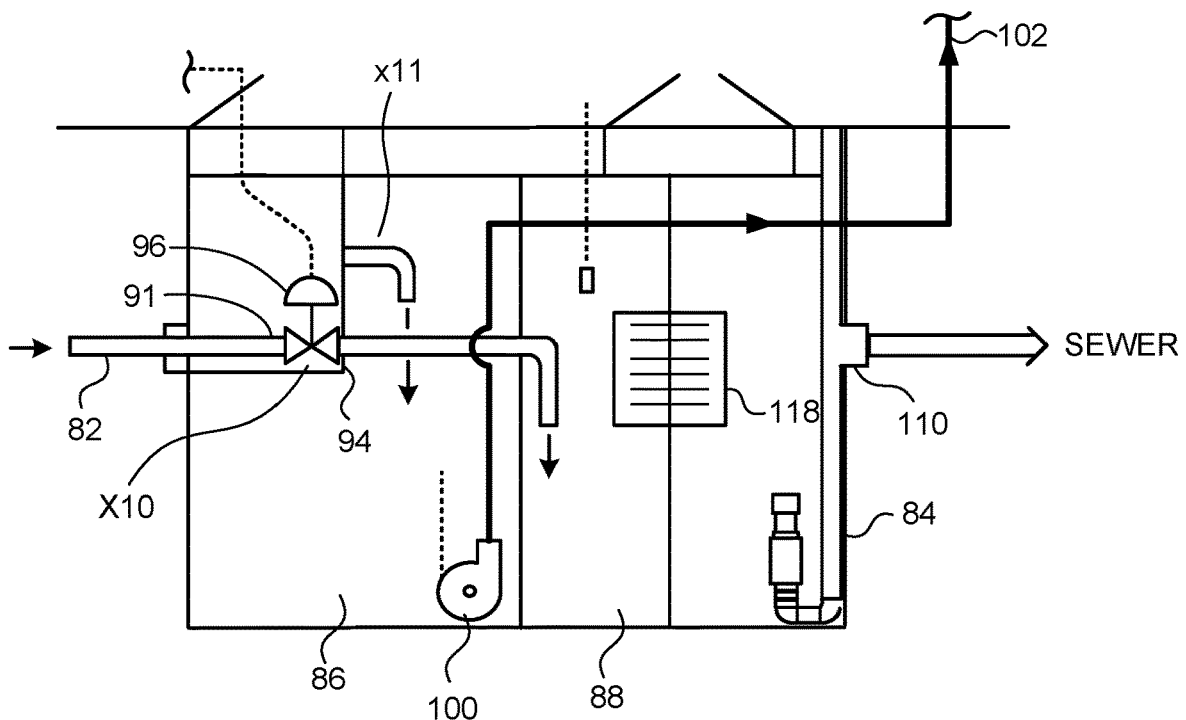
FIG. 6 is a schematic diagram showing the firefighting foam waste management system of the present invention utilizing a two-way diverter valve in a covered service area.

FIGS. 5 and 6 show the use of a two way diverter valve X10 in place of the three-way diverter valve 90 as shown in FIGS. 3 and 4. The two way diverter valve X10 has an inlet 91, an outlet 94 and a controller 96. The two-way diverter valve X10 is in a normally open position allowing hangar wastewater to flow to the second chamber 88 and then to the sewer. During a fire firefighting system activation, the valve X10 will close. Wastewater flow will accumulate in the diverter compartment until the level rises and reaches outlet X11. This vertical distance will be generally equal to or greater than the pipe diameter of diverter valve X10. The wastewater will flow into the first chamber 86. FIG. 5, in particular, shows the flow to a container. FIG. 6 shows the flow from the outlet to the sewer.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wastewater management system comprising:
a container having a first chamber and a second chamber therein, the first chamber having a lift station therein, the second chamber having an oil-water separator therein;
a diverter valve positioned in said container having an inlet and a first outlet and a second outlet, the first outlet being directed to the first chamber, the second outlet being directed to the second chamber, the inlet of said diverter valve adapted to receive wastewater from a location remote from said container, said diverter valve being actuatable so as to move to a first position wherein the inlet connects to the first outlet and to move to a second position wherein the inlet connects to the second outlet, the second outlet adapted to pass the wastewater to the oil-water separator in the second chamber of said container;
a holding tank connected or interconnected to the first outlet, said holding tank adapted to receive a fire suppressing foam therein, the lift station adapted to pass the fire suppressing foam to said holding tank; and
a controller connected to said diverter valve so as to move said diverter valve from the second portion to the first position when the fire-suppressing foam is released at the remote location.

2. The wastewater management system of claim 1, the lift station being below grade, said holding tank being above grade.

3. The wastewater management system of claim 1, the oil-water separator causing the wastewater to have an oil component and a water component, the second chamber having a first outlet connected to a sewer so that the water component can flow to the sewer, the second chamber having a second outlet whereby the oil component can be removed or passed from the oil-water separator.

4. The wastewater management system of claim 1, said holding tank comprising a first holding tank and a second holding tank, the first outlet of said diverter valve being connected or interconnected to at least one of the first and second holding tanks.

5. The wastewater management system of claim 1, further comprising:
a hangar having a floor, the floor having a trench therein, the trench being adapted to receive the one type of wastewater therein; and
a pipe opening, to the trench and connected to the inlet of said diverter valve.

6. The wastewater management system of claim 5, further comprising:
a fire suppression system cooperative with, an interior of said hangar, said fire suppression system adapted to release the fire suppressing foam upon receiving an actuation signal.

7. The wastewater management system of claim 1, wherein the first chamber is said holding tank.

8. A fire suppressing foam wastewater management system comprising:
a hangar having a floor, the floor having a trench therein, the trench adapted to receive the fire suppressing foam therein;
a fire suppression system cooperative with an interior of said hangar, said fire suppression system adapted to release the fire suppressing foam upon receiving an actuation signal;
a container having a first chamber and a second chamber therein;
a diverter valve positioned in said container and having an inlet and a first outlet and a second outlet, the first outlet being directed to the first chamber, the second outlet being directed to the second chamber, the inlet of said diverter valve adapted to receive the fire suppressing foam or a wastewater from the trench of said hangar, said diverter valve being actuatable so as to move from a first position wherein the inlet connects to the first outlet and a second position wherein the inlet is connected to the second outlet;
a pipe opening to the trench and connected to the inlet of said diverter valve;
a holding tank connected or interconnected to the first outlet, said holding tank adapted receive the fire suppressing foam therein, said first chamber having a lift station therein, said lift station having an outlet directed to said holding tank, said lift station adapted to pump the fire suppressing foam to said holding tank, the second chamber of said container having an oil-water separator therein, the second outlet of said diverter valve directing an oil-containing wastewater to the oil-water separator; and
a controller connected to said diverter valve so as to move said diverter valve from the second position to the first position when said fire suppression system receives the actuation signal.

9. The fire suppressing foam wastewater management system of claim 8, the oil-water separator causing the wastewater to have an oil component and a water component, the second chamber having a first outlet connected to a sewer so that the water component can flow to the sewer, the second chamber having a second outlet wherein the oil can be removed therefrom or passed from the oil-water separator.

10. The fire suppressing foam wastewater management system of claim 8, said container being below grade, said holding tank being above grade.

11. The fire suppressing foam wastewater management system of claim 8, said holding tank comprising a first holding tank and a second holding tank, the first outlet of said diverter valve being connected or interconnected to at least one of the first and second holding tanks.

* * * * *